(12) United States Patent
Lee et al.

(10) Patent No.: US 7,220,100 B2
(45) Date of Patent: May 22, 2007

(54) CRESCENTIC RAMP TURBINE STAGE

(75) Inventors: Ching-Pang Lee, Cincinnati, OH (US); Anna Tam, Clifton Park, NY (US); Kevin Richard Kirtley, Scotia, NY (US); Scott Henry Lamson, Menands, NY (US)

(73) Assignee: General Electric Company, Schenectady, NY (US)

( * ) Notice: Subject to any disclaimer, the term of this patent is extended or adjusted under 35 U.S.C. 154(b) by 81 days.

(21) Appl. No.: 11/106,198

(22) Filed: Apr. 14, 2005

(65) Prior Publication Data

US 2006/0233641 A1 Oct. 19, 2006

(51) Int. Cl.
*F01D 5/22* (2006.01)
(52) U.S. Cl. .................. 415/191; 415/914; 416/193 A
(58) Field of Classification Search .............. 415/191, 415/208.1, 205, 210.1, 914; 416/193 A, 416/228
See application file for complete search history.

(56) References Cited

U.S. PATENT DOCUMENTS

| | | | |
|---|---|---|---|
| 2,735,612 A * | 2/1956 | Hausmann | 415/208.1 |
| 4,194,869 A | 3/1980 | Corcokios | |
| 4,384,822 A * | 5/1983 | Schweikl et al. | 415/137 |
| 4,778,338 A | 10/1988 | Bessay | |
| 4,832,567 A | 5/1989 | Bessay | |
| 5,397,215 A | 3/1995 | Spear et al. | |
| 5,954,475 A | 9/1999 | Matsuura et al. | |
| 6,017,186 A | 1/2000 | Hoeger et al. | |
| 6,283,713 B1 | 9/2001 | Harvey et al. | |
| 6,338,609 B1 | 1/2002 | Decker et al. | |
| 6,341,939 B1 | 1/2002 | Lee | |
| 6,354,797 B1 | 3/2002 | Heyward et al. | |
| 6,419,446 B1 | 7/2002 | Kvasnak et al. | |
| 6,511,294 B1 | 1/2003 | Meilke et al. | |
| 6,561,761 B1 | 5/2003 | Decker et al. | |
| 6,669,445 B2 | 12/2003 | Staubach et al. | |
| 6,785,961 B1 * | 9/2004 | Caddell et al. | 29/889.1 |
| 6,837,679 B2 | 1/2005 | Kawarada et al. | |
| 6,969,232 B2 * | 11/2005 | Zess et al. | 415/191 |
| 7,134,842 B2 * | 11/2006 | Tam et al. | 416/193 A |
| 2004/0081548 A1 | 4/2004 | Zess et al. | |

FOREIGN PATENT DOCUMENTS

CH 229266 1/1944

(Continued)

OTHER PUBLICATIONS

Patent Abstract of Japan, vol. 007, No. 112 (M-215), May 17, 1983, European Patent Office, publication No. 58032903, pub. Date Feb. 26, 1983, single page.

(Continued)

*Primary Examiner*—Igor Kershteyn
(74) *Attorney, Agent, or Firm*—William S. Andes; Francis L. Conte

(57) ABSTRACT

A turbine stage includes a row of airfoils joined to corresponding platforms to define flow passages therebetween. Each airfoil includes opposite pressure and suction sides and extends in chord between opposite leading and trailing edges. Each platform includes a crescentic ramp increasing in height from the leading and trailing edges toward the midchord of the airfoil along the pressure side thereof.

24 Claims, 9 Drawing Sheets

FOREIGN PATENT DOCUMENTS

FR        1602965        4/1971
JP        58-32903        2/1983

OTHER PUBLICATIONS

Harvey et al, "Non-Asxisymmetric Turbine End Wall Design: Part 1 Three Dimensional Linear Design System," ASME 99-GT-337, Jun. 1999, pp. 1-9.

U.S. Appl. No. 11/010,688, filed Dec. 13, 2004, "Fillet Energized Turbine Stage," Ching-Pang Lee [GE158088].

U.S. Appl. No. 11/022,121, filed Dec. 24, 2004, "Scalloped Surface Turbine Stage," A. Tam et al [GE161855].

U.S. Appl. No. 11/035,866, filed Jan. 10, 2005, "Funnel Fillet Turbine Stage," C. Lee et al [GE162846].

* cited by examiner

CRESCENTIC RAMP TURBINE STAGE

The U.S. Government may have certain rights in this invention pursuant to contract number NAS3-01135 awarded by NASA.

The present invention relates generally to gas turbine engines, and, more specifically, to turbines therein.

In a gas turbine engine air is pressurized in a compressor and mixed with fuel in a combustor for generating hot combustion gases. Turbine stages extract energy from the combustion gases to power the compressor, while also powering an upstream fan in a turbofan aircraft engine application, or powering an external drive shaft for marine and industrial applications.

A high pressure turbine (HPT) immediately follows the combustor and includes a stationary turbine nozzle which discharges combustion gases into a row of rotating first stage turbine rotor blades extending radially outwardly from a supporting rotor disk. The HPT may include one or more stages of rotor blades and corresponding turbine nozzles.

Following the HPT is a low pressure turbine (LPT) which typically includes multiple stages of rotor blades and corresponding turbine nozzles.

Each turbine nozzle includes a row of stator vanes having radially outer and inner endwalls in the form of arcuate bands which support the vanes. Correspondingly, the turbine rotor blades include airfoils integrally joined to radially inner endwalls or platforms supported in turn by corresponding dovetails which mount the individual blades in dovetail slots formed in the perimeter of the supporting rotor disk. An annular shroud surrounds the radially outer tips of the rotor airfoils in each turbine stage in the HPT in particular. In the LPT, tip shrouds are typically formed integral with the airfoil tips.

The stator vanes and rotor blades have corresponding airfoils including generally concave pressure sides and generally convex suction sides extending axially in chord between opposite leading and trailing edges. Adjacent vanes and adjacent blades form corresponding flow passages therebetween bound by the radially inner and outer endwalls.

During operation, the combustion gases are discharged from the combustor and flow axially downstream through the respective flow passages defined between the stator vanes and rotor blades. The aerodynamic contours of the vanes and blades, and corresponding flow passages therebetween, are precisely configured for maximizing energy extraction from the combustion gases which in turn rotate the rotor from which the blades extend.

The complex three-dimensional (3D) configuration of the vane and blade airfoils is tailored for maximizing efficiency of operation, and varies radially in span along the airfoils as well as axially along the chords of the airfoils between the leading and trailing edges. Accordingly, the velocity and pressure distributions of the combustion gases over the airfoil surfaces as well as within the corresponding flow passages also vary.

Undesirable pressure losses in the combustion gas flowpaths therefore correspond with undesirable reduction in overall turbine efficiency. For example, the combustion gases enter the corresponding rows of vanes and blades in the flow passages therebetween and are necessarily split at the respective leading edges of the airfoils.

The locus of stagnation points of the incident combustion gases extends along the leading edge of each airfoil, and corresponding boundary layers are formed along the pressure and suction sides of each airfoil, as well as along each radially outer and inner endwall which collectively bound the four sides of each flow passage. In the boundary layers, the local velocity of the combustion gases varies from zero along the endwalls and airfoil surfaces to the unrestrained velocity in the combustion gases where the boundary layers terminate.

One common source of turbine pressure losses is the formation of horseshoe vortices generated as the combustion gases are split in their travel around the airfoil leading edges. A total pressure gradient is effected in the boundary layer flow at the junction of the leading edge and endwalls of the airfoil. This pressure gradient at the airfoil leading edges forms a pair of counterrotating horseshoe vortices which travel downstream on the opposite sides of each airfoil near the endwall.

The two vortices travel aft along the opposite pressure and suction sides of each airfoil and behave differently due to the different pressure and velocity distributions therealong. For example, computational analysis indicates that the suction side vortex migrates away from the endwall toward the airfoil trailing edge and then interacts following the airfoil trailing edge with the pressure side vortex flowing aft thereto.

The interaction of the pressure and suction side vortices can occur near the midspan region of the airfoils and creates total pressure loss and a corresponding reduction in turbine efficiency. These vortices also create turbulence and increase undesirable heating of the endwalls.

Since the horseshoe vortices are formed at the junctions of turbine rotor blades and their integral root platforms, as well at the junctions of nozzle stator vanes and their outer and inner bands, corresponding losses in turbine efficiency are created, as well as additional heating of the corresponding endwall components.

Accordingly, it is desired to provide an improved turbine stage for reducing horseshoe vortex affects.

BRIEF DESCRIPTION OF THE INVENTION

A turbine stage includes a row of airfoils joined to corresponding platforms to define flow passages therebetween. Each airfoil includes opposite pressure and suction sides and extends in chord between opposite leading and trailing edges. Each platform includes a crescentic ramp increasing in height from the leading and trailing edges toward the midchord of the airfoil along the pressure side thereof.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
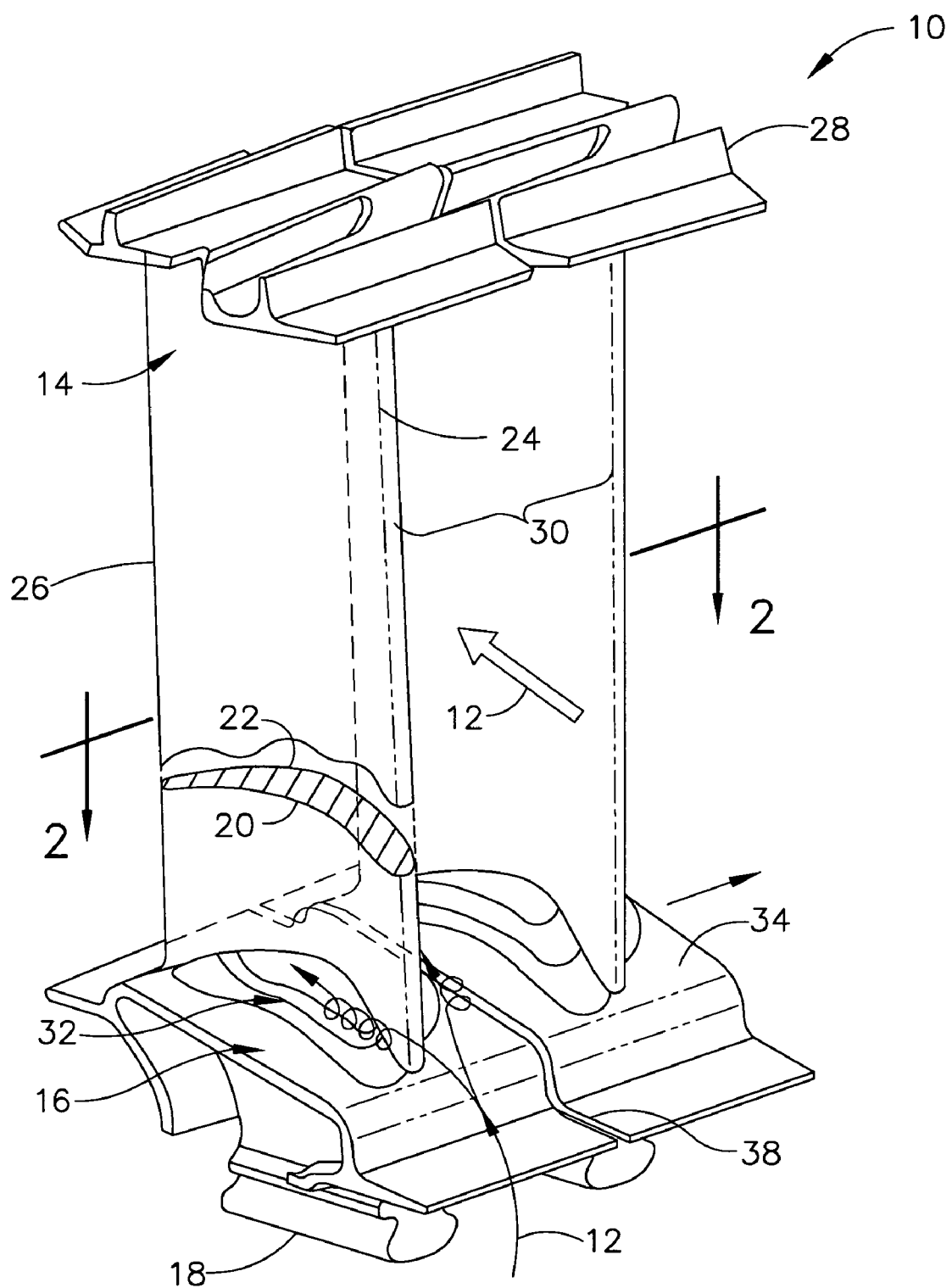
FIG. 1 is a forward-facing-aft isometric view of exemplary turbine blades in a low pressure turbine stage row.

Illustrated in FIG. 1 are two exemplary first stage LPT turbine rotor blades 10 which circumferentially adjoin each other in a full row thereof in a corresponding turbine stage of a gas turbine engine. As indicated above, combustion gases 12 are formed in a conventional combustor (not shown) and discharged in the axial downstream direction firstly through the HPT stage and then through the row of LPT blades 10 which extract energy therefrom for powering a supporting rotor disk (not shown) on which the blades are mounted.

The turbine stage includes a complete row of the blades, with each blade having a corresponding airfoil 14 integrally joined at a root end to a corresponding radially inner endwall or platform 16. Each platform is in turn integrally joined to a corresponding axial-entry dovetail 18 conventionally configured for supporting the corresponding turbine blade in the perimeter of the rotor disk.

Each airfoil includes a generally concave pressure side 20 and a circumferentially or laterally opposite, generally convex suction side 22 extending axially in chord between opposite leading and trailing edges 24,26. The two edges extend radially in span from root to tip of the airfoil.

The exemplary blades 10 illustrated in FIG. 1 are configured for use in the low pressure turbine, with the LPT airfoils 14 thereof being relatively longer in radial span than the typically short airfoils of high pressure turbines. The LPT airfoils 14 are typically solid, with solid radial sections as illustrated in FIGS. 1 and 2 from root to tip with no internal voids or channels since LPT airfoils are typically not internally cooled, whereas HPT airfoils are hollow for internal cooling thereof.

As shown in FIG. 1, each airfoil 14 includes a tip shroud 28 integrally joined to the distal tip end thereof, with the adjacent tip shrouds forming a complete segmented annular shroud around the full row of the LPT rotor blades.

In the LPT configuration, the platforms 16 typically slope radially outwardly toward the tip shrouds 28 and aft from the leading edge 24 to the trailing edge 26 of each blade. The radial span or height of each airfoil typically increases in the axial downstream direction along the sloping platform from the leading edge to the trailing edge.

Figure 2:
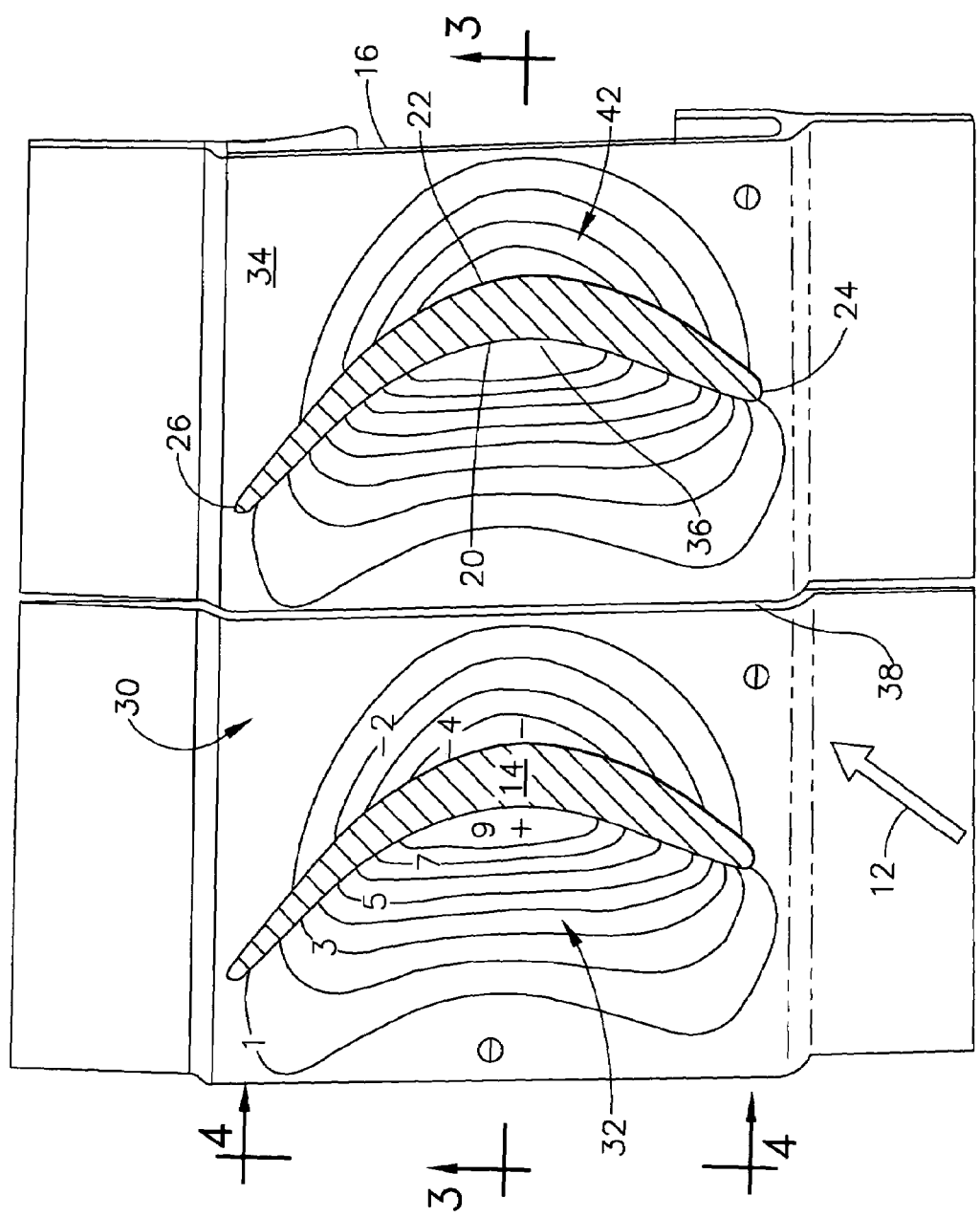
FIG. 2 is a planiform sectional view through the blades illustrated in FIG. 1 and taken along line 2—2, and includes isoclines of the platform surface.

The exemplary turbine blades illustrated in FIGS. 1 and 2 may have any conventional configuration of the airfoil, platform, and dovetail for extracting energy from the combustion gases 12 during operation. As indicated above, the platform 16 is integrally joined to the root end of the airfoil and defines the radially inner flow boundary for the combustion gases 12.

The blades are mounted in a row around the perimeter of the rotor disk, with the adjacent airfoils 14 being spaced circumferentially or laterally apart to define therebetween flow passages 30 for channeling the combustion gases 12 axially in the downstream direction during operation.

Each inter-airfoil flow passage 30 in the turbine stage illustrated in FIGS. 1 and 2 is therefore defined and bounded by the pressure side 20 of one airfoil, the suction side 22 of the next adjacent airfoil, the corresponding pressure and suction side portions of the adjacent platforms 16, and the radially outer tip shroud 28 disposed at the radially outer tip ends of the airfoils in the complete row of turbine blades.

As indicated above in the Background section, the combustion gases 12 flow through the corresponding flow passages 30 during operation and are necessarily split by the individual airfoils 14. The high velocity combustion gases are circumferentially split at the corresponding airfoil leading edges 24 with a stagnation pressure thereat, and with the formation of corresponding boundary layers along the opposite pressure and suction sides of the airfoil.

Furthermore, the combustion gases also form a boundary layer along the individual blade platforms 16 as the gases are split around the airfoil leading edge at its juncture with the platform.

Accordingly, the split combustion gas flow along the blade platforms results in a pair of counterrotating horseshoe vortices, as shown in FIG. 1, which flow axially downstream through the flow passages along the opposite pressure and suction sides of each airfoil. These horseshoe vortices create turbulence in the boundary layers, and migrate radially outwardly toward the mid-span regions of the airfoils and create losses of total pressure and reduce turbine efficiency.

The exemplary turbine rotor stage illustrated in FIG. 1 may have any conventional configuration such as that specifically designed as a first stage LPT rotor for extracting energy from the combustion gases to power the fan in a typical manner. As indicated above in the Background section, the incident combustion gases 12 are split along the airfoil leading edges 24 to flow axially through the corresponding flow passages 30 in the downstream direction.

The concave profile of the pressure sides 20 and the convex profile of the suction sides 22 are specifically configured for effecting different velocity and pressure distributions for maximizing extraction of energy from the combustion gases. And, the platforms 16 define radially inner endwalls which bound the combustion gases, with the gases also being bound radially outwardly by the surrounding tip shrouds 28.

In this configuration, the incident combustion gases at the junction of the platforms and leading edges is subject to the horseshoe vortices which progress through the flow passages along the opposite pressure and suction sides of the airfoils. As indicated above, these vortices create turbulence, decrease the aerodynamic efficiency of the turbine stage, and increase the heat transfer heating of the platforms.

Accordingly, the platforms 16 illustrated initially in FIG. 1 are specifically configured with ramped flow surfaces that bound the combustion gases for reducing the strength of the horseshoe vortices. An exemplary configuration of the ramped platforms is shown generally in FIG. 1 with isoclines of common elevation from a nominally axisymmetric platform. And, FIG. 2 illustrates in more detail the isoclines in planiform view.

Modern computational fluid dynamics have been used to study and define the specific 3D contours of the platforms for weakening the horseshoe vortices and correspondingly improving turbine efficiency. Each of the platforms 16 illustrated in FIGS. 1 and 2 includes a local crescentic or crescent ramp 32 rising upwardly (+) into the flow passage 30 relative to the nominal axisymmetric reference outer surface 34 of an otherwise conventional platform that defines the reference zero ($^\theta$) surface.

It is noted that the specific sizes and spacing of the airfoils 14 are selected for a particular engine design and mass flowrate therethrough. The arcuate sidewalls of the airfoils typically define the flow passage 30 circumferentially therebetween that converges in the axial downstream direction from the leading edges to the trailing edges.

As shown in FIG. 2, each airfoil has a relatively high degree of camber which defines a corresponding crescent shape thereof. The platform ramp 32 correspondingly has a crescent shape due to its location along most of the pressure side 20 of the airfoil. And, the isoclines of equal elevation also exhibit corresponding crescent shapes with the airfoil pressure side 20 at which they end.

The trailing edge of one airfoil typically forms a throat of minimum flow area along its perpendicular intersection near the midchord of the suction side of an adjacent airfoil. The flow area of the flow passage 30, including the minimum flow area of the throat thereof, are preselected for a given engine application and therefore are controlled by both the radially inner endwall defined by platform 16, as well as the radially outer endwalls defined by the tip shrouds 28.

The reference platform surface 34 may therefore be conveniently defined as the conventional axisymmetrical surface defined by circular arcs around the circumference of the turbine stage, and may be used as the zero reference elevation illustrated in FIG. 2. The platform ramp 32 therefore rises radially outwardly in elevation (+) from the zero reference plane or surface and locally reduces the radial span of the airfoil at the junction with the root end thereof.

Figure 3:
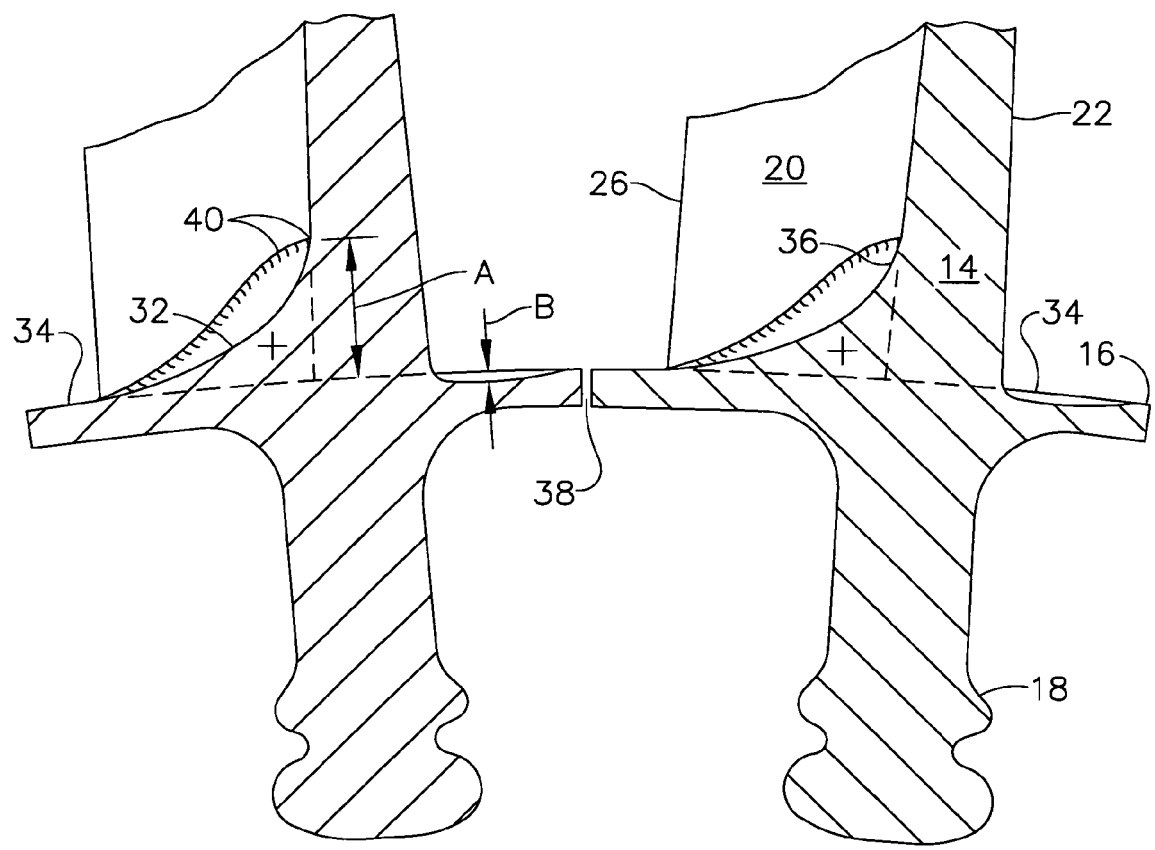
FIG. 3 is a radial sectional view of the blades illustrated in FIG. 2 and taken along line 3—3.

As illustrated in FIGS. 2 and 3, the platform ramp 32 increases in radial elevation or height A relative to the nominal outer surface 34 as it joins the pressure side of each airfoil. FIG. 2 illustrates isoclines of equal height (+) above the reference surface 34 which increase in magnitude linearly, with arbitrary numerical values 1–9 being assigned thereto.

Each of the ramps 32 illustrated in FIG. 2 includes a peak or crest 36 of maximum height disposed near the midchord of the airfoil which corresponds with the maximum magnitude 9, which in an exemplary embodiment may be about 5.2 mm. In view of the LPT configuration of the airfoil 14 and its relatively high camber, the crest 36 is located closely adjacent to the midchord region of the airfoil as opposed to the opposite leading and trailing edges, and within about plus or minus 10 percent of the chord length from the midchord of the airfoil.

In the exemplary embodiment illustrated in FIG. 2, the isoclines for the platform ramp 32 illustrate that the ramp diverges substantially symmetrically from the crest 36 along the pressure side 20, and outwardly towards the leading and trailing edges 24,26 of the airfoil along its circumferential extent between adjacent airfoils.

The platforms 16 illustrated in top view in FIG. 2 and in radial sectional view in FIG. 3 have corresponding axial splitlines 38 defined by their corresponding circumferential edges which divide circumferentially the corresponding flow passage 30 formed between the opposite pressure and suction sides of adjacent airfoils 14.

Correspondingly, each of the platform ramps 32 decreases in height circumferentially from the pressure side 20 of each airfoil circumferentially toward the corresponding splitline 38. The individual platform ramps therefore provide a local elevation in the platform outer surface which begins near the perimeter of the platform and blends smoothly upwardly to the pressure side of the airfoil.

FIGS. 2 and 3 also illustrate the nominal outer surface 34 from which the ramps 32 increase in height toward the pressure side 20. This nominal outer surface 34 would be the conventional axisymmetric or cylindrical surface in a typical low pressure turbine without the addition of the ramp.

FIG. 2 best illustrates the crescent shape or profile of the platform ramp 32 which follows the crescent or concave contour of the airfoil pressure side 20. Each ramp 32 preferably terminates axially near the leading and trailing edges 24,26 and smoothly blends with the nominal outer surface 34 thereat.

Correspondingly, each ramp 32 also preferably terminates circumferentially at or near the corresponding axial splitlines 38. In this way, the overall configuration of the platform ramp 32 is a crescent having a relatively large width in the circumferential direction in the plane of the crest and decreasing in width axially towards the opposite leading and trailing edges of the airfoil where the ramp terminates and blends with the nominal outer surface of the platform.

The preferential location and configuration of the platform ramp 32 along the airfoil pressure side may be used to advantage for reducing the strength of the horseshoe vortices and improving turbine efficiency as further explained hereinbelow. Each crescentic ramp 32 may be specifically tailored or configured for the specific LPT design to reduce the adverse affects of the horseshoe vortices. Modern computational analysis permits iteration of the ramp design to maximize its benefit.

FIG. 3 is a radial sectional view through the crest of the platform ramp and illustrates that the ramps are preferably concave circumferentially outwardly from the airfoil pressure sides 20 to the termination thereof at the splitlines. FIG. 3 is also representative of similar concave cross sections for the ramp at the other axial positions between the crests 36 and leading and trailing edges 24,26 on opposite sides thereof, with those sections decreasing in size at those positions.

Figure 4:
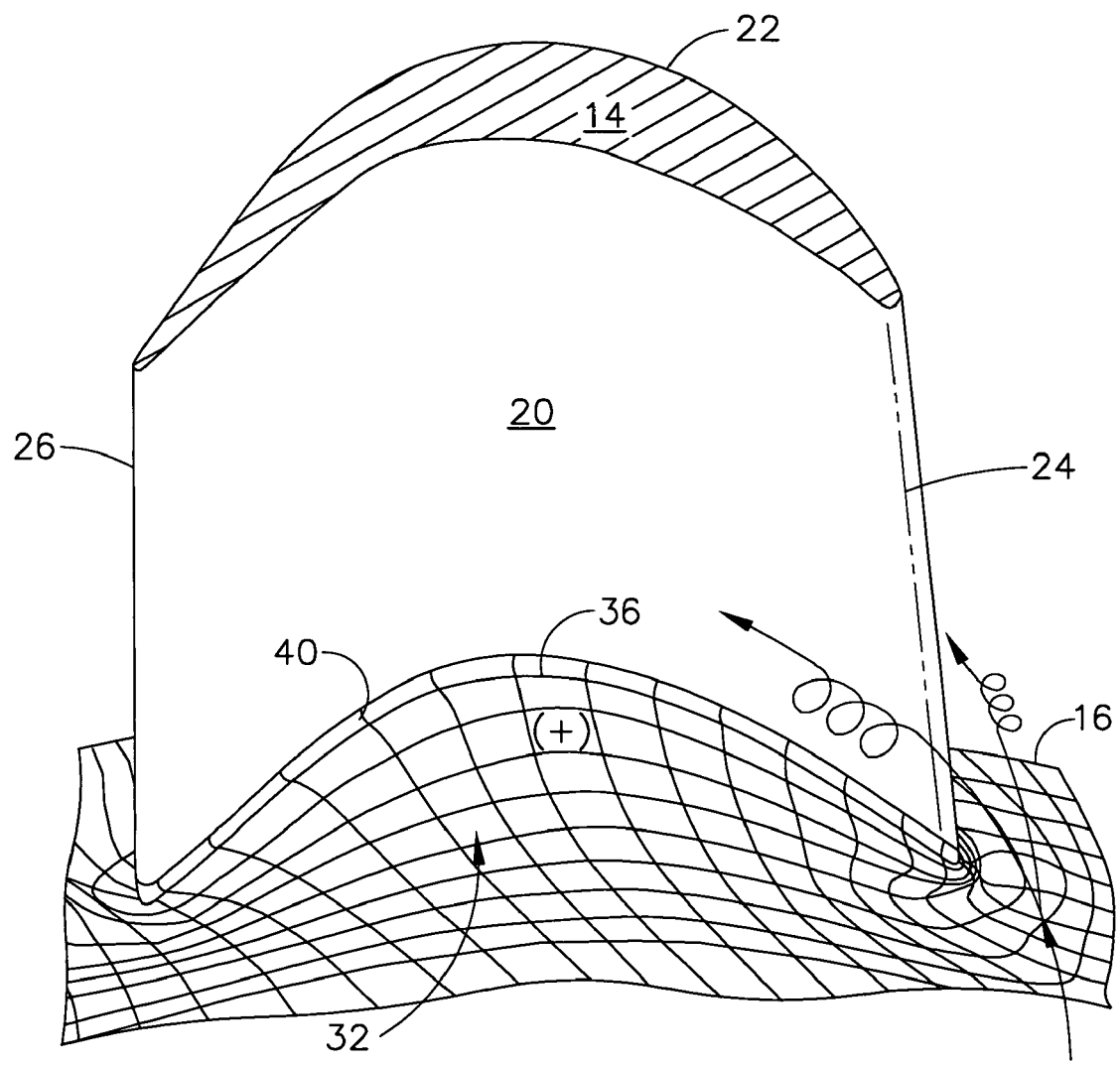
FIG. 4 is a side isometric view of the platform ramp adjoining the pressure side of the blade illustrated in FIG. 2 and taken along line 4—4.

The concave ramps 32 illustrated in FIGS. 3 and 4 blend smoothly at the outer perimeter thereof with the platforms from which they extend, and also adjoin the corresponding airfoil pressure sides 20 along a corresponding arcuate or concave fillet 40. The small fillet 40 provides a smooth transition between each platform ramp and the pressure side of the corresponding airfoil along the full axial extent of the ramp between the leading and trailing edges 24,26.

As best illustrated in FIG. 4, each of the ramps 32 is also convex axially along the fillet 40 and increases in height from the opposite leading and trailing edges 24,26 to the crest 36 of maximum height axially therebetween.

Figure 5:
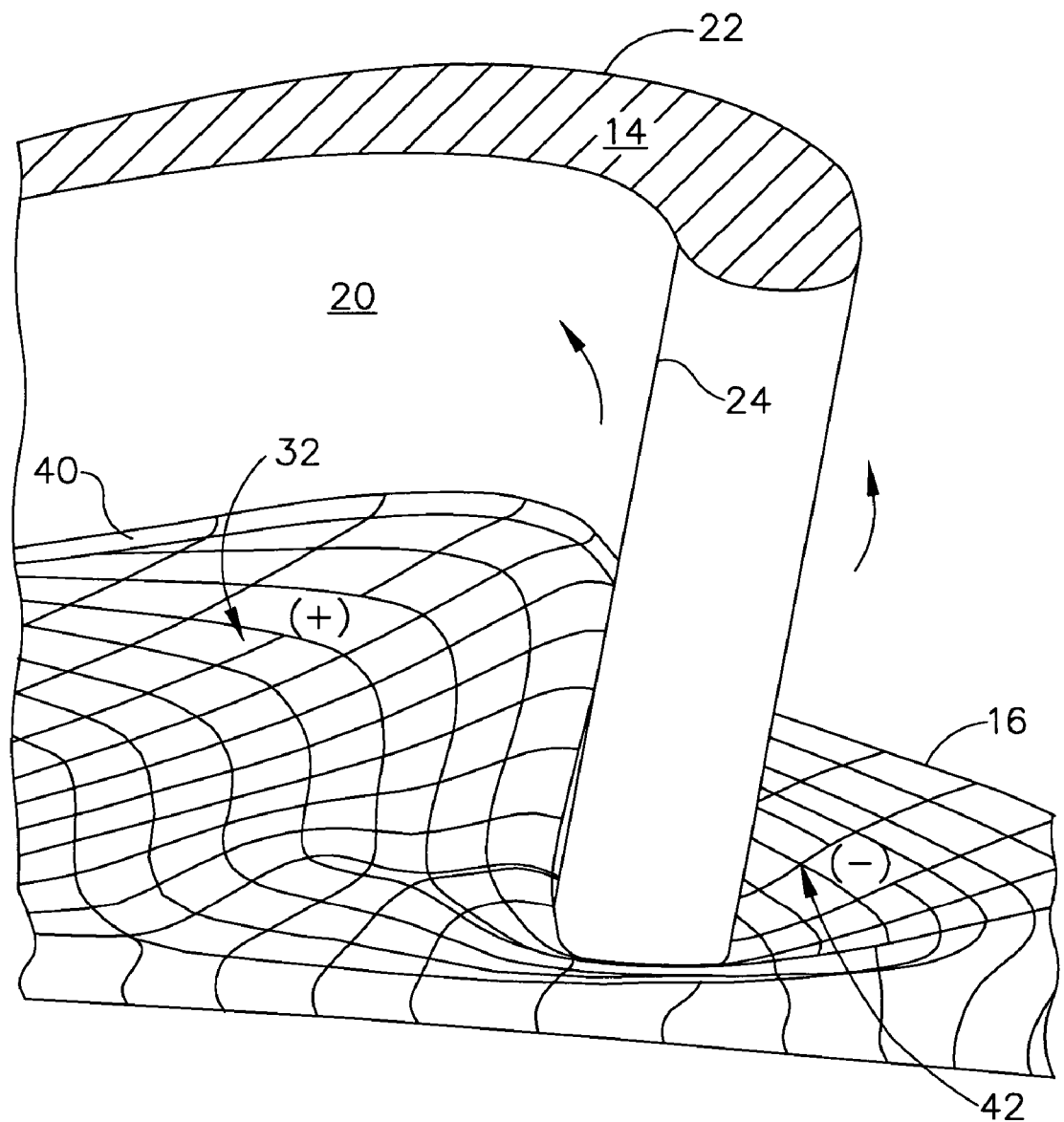
FIG. 5 is another isometric view of the platform ramp joining the airfoil pressure side shown in FIG. 4 from the perspective of the leading edge.
Figure 6:
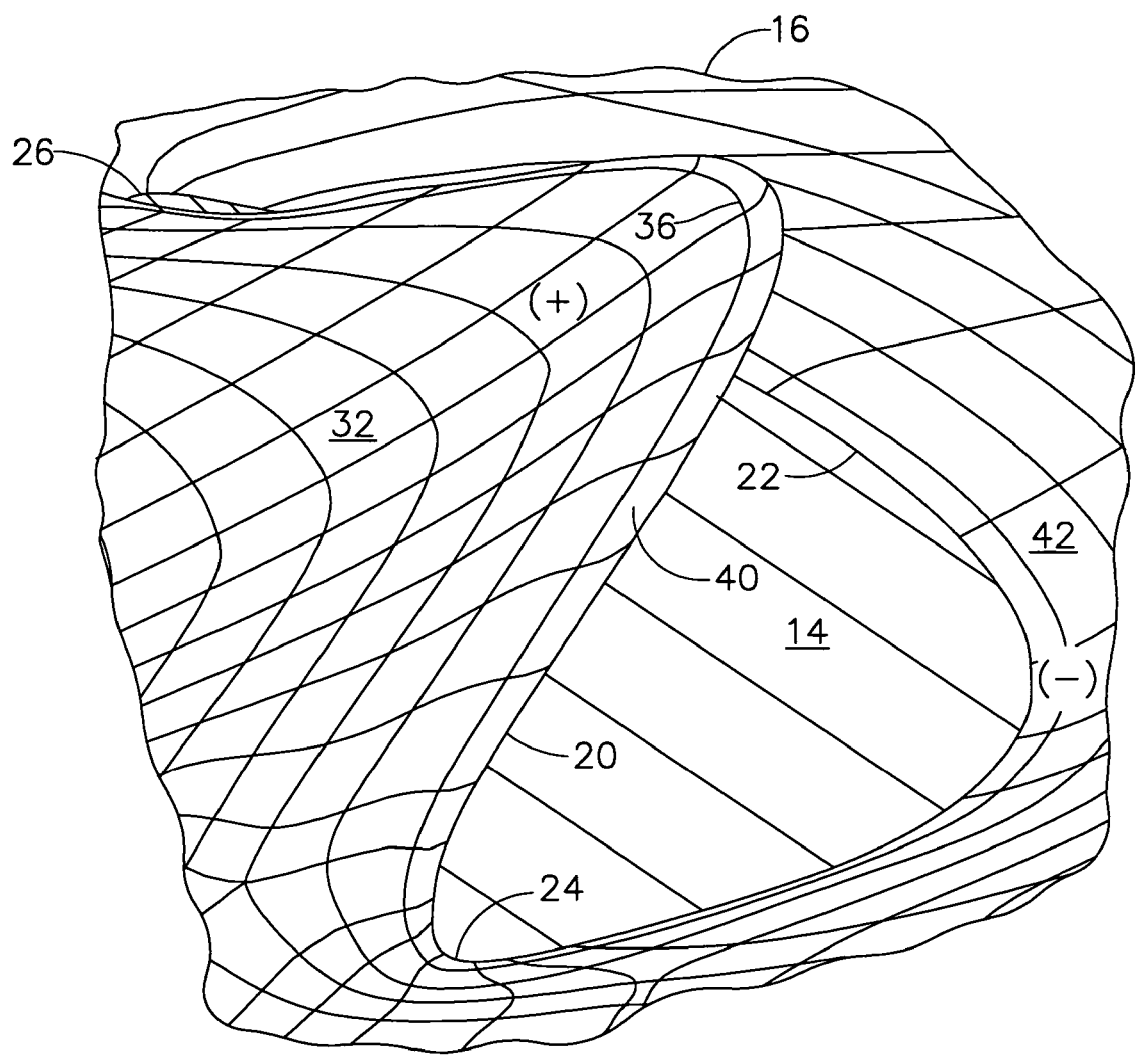
FIG. 6 is an enlarged isometric view of the platform ramp illustrated in FIG. 5 with the outer end of the airfoil being removed for clarity of presentation.

FIGS. 4–6 show a preferred embodiment of the platform ramp 32 superimposed with a computer generated grid pattern to better illustrate the surface contour thereof. FIG. 4 illustrates the general symmetry of the ramp 32 on opposite sides of the middle crest thereof. FIGS. 5 and 6 illustrate blending of the ramp 32 along the airfoil pressure side and termination thereof at the opposite leading and trailing edges.

FIGS. 4–6 illustrate an exemplary embodiment generated by computational fluid dynamics analysis in which the platform ramp 32 is smooth from its outer perimeter at the nominal outer surface of the platform to the fillet 40 on the pressure side of the airfoil over the full extent of the ramp between the leading and trailing edges 24,26.

As additionally shown in FIG. 2, the platform ramp 32 terminates just short of the leading edge 24 on the forward side of the platform and just short of the trailing edge 26 on the aft side of the platform. The ramp thus decreases in elevation to return to the nominal outer surface 34 at both the leading and trailing edges.

The exemplary LPT blades 10 illustrated in FIG. 1 have relatively low solidity with a fewer number of blades in the full row than a typical higher solidity LPT for reducing weight and cost. However, fewer blades requires each blade to extract more energy from the combustion gases, which therefore requires more camber and lift capability in each airfoil.

As the number of blades is reduced, the circumferential spacing or pitch therebetween increases, and correspondingly increases the aerodynamic affects of the radial endwalls defined by the radially inner platform 16 and radially outer tip shroud 28.

The conventional Zweifer number is used in aerodynamic design to represent the lift capability of the airfoil. The Zweifer number is a function of the circumferential spacing between adjacent airfoils, the axial width of the airfoil, the radial heights of the airfoil along the leading and trailing edges, and the relative flow inlet and outlet angles at the leading and trailing edges.

In a modern conventional turbine stage, the Zweifer number equals 1.0. As the number of turbine blades is reduced, the Zweifer number increases to 1.25 for high lift turbines, and 1.35 in ultra high lift turbines. The low solidity and high Zweifer number in turbine stages increase the surface area of each blade platform and therefore increase the effect thereof on overall turbine efficiency.

The exemplary turbine stage illustrated in FIG. 2 has a low solidity and high Zweifer number greater than 1.0, with correspondingly large blade platforms 16. The platform ramp 32 may be used to aerodynamic advantage on the pressure side of the airfoil over a majority of the platform surface area to the axial splitline.

And, each platform may also include a shallow depression or bowl 42 along the suction side 22 of each airfoil to complement the elevated ramp 32 on the opposite side of the airfoil. The bowl 42 increases in depth B, as illustrated in FIG. 3, from the nominal outer surface 34 near the corresponding axial splitline 38 to the corresponding suction side 22 of the airfoil 14 directly behind the corresponding crest 36 of maximum height.

The individual bowl 42 in each blade platform is preferably semicircular and centered on the suction side 20 behind the corresponding crest 36 on the pressure side 20. Each bowl 42 also terminates at the nominal outer surface 34 before or spaced from the corresponding leading and trailing edges 24,26 on opposite sides of the bowl.

As shown in FIG. 2, the bowl is represented by four isoclines of increasing depth (−) below the nominal reference surface, with the maximum depth of the bowl, about −4, being less than about half the maximum height, about +9/2, of the crest in this embodiment. In other words, the bowl is relatively shallow compared to the elevation of the ramp, and both cooperate together for reducing the adverse affects of the horseshoe vortices during operation to correspondingly increase turbine efficiency, particularly at the platform endwall.

Figure 7:
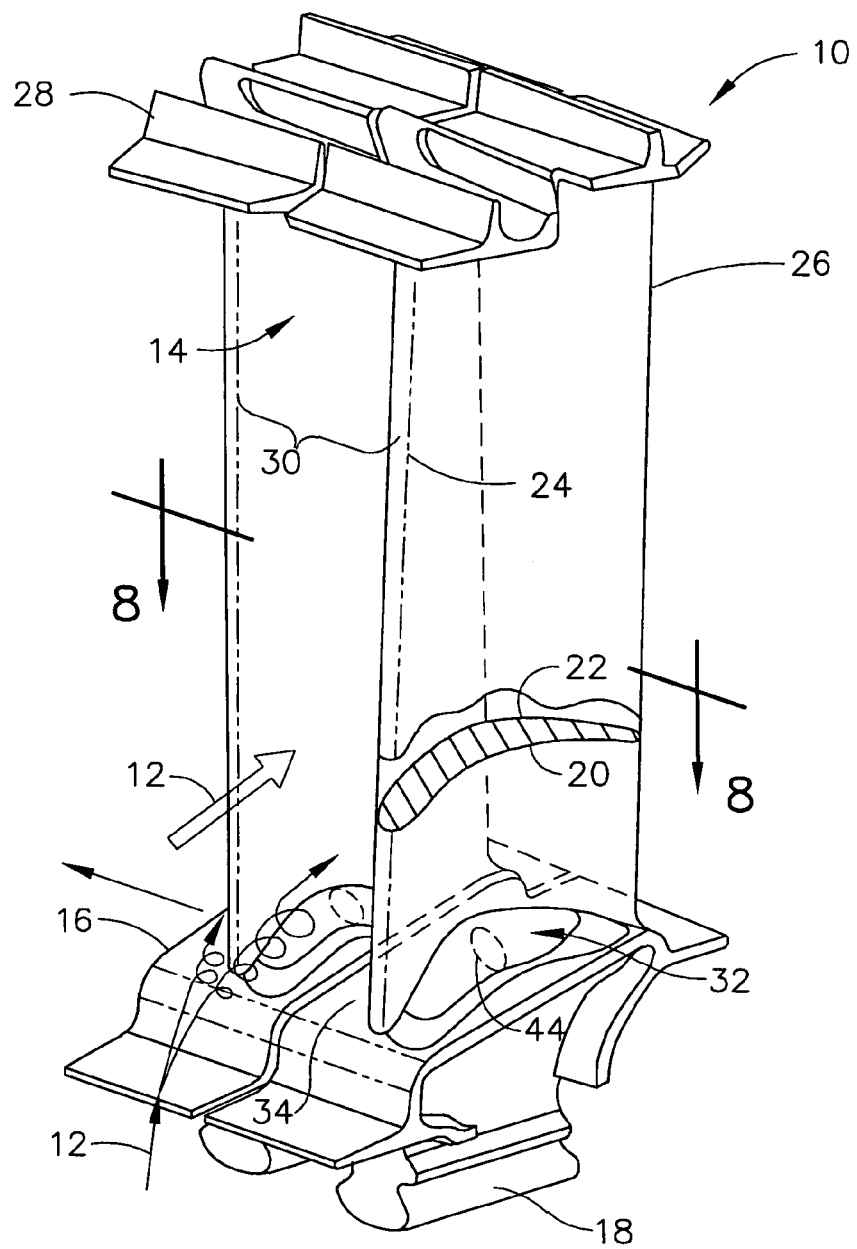
FIG. 7 is an isometric view, like FIG. 1, of LPT blades having platform ramps in accordance with another embodiment.
Figure 8:
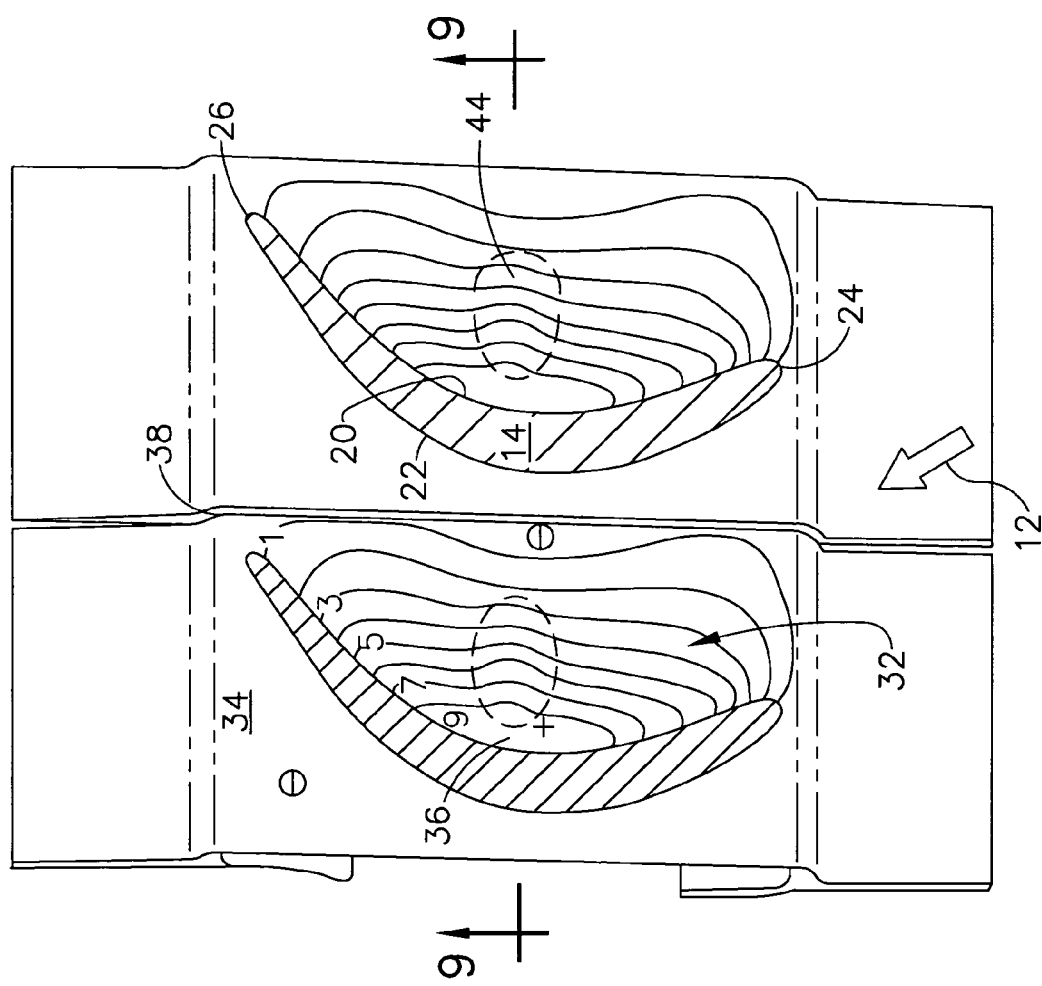
FIG. 8 is a planiform sectional view through the blades illustrated in FIG. 7 and taken along line 8—8.
Figure 9:
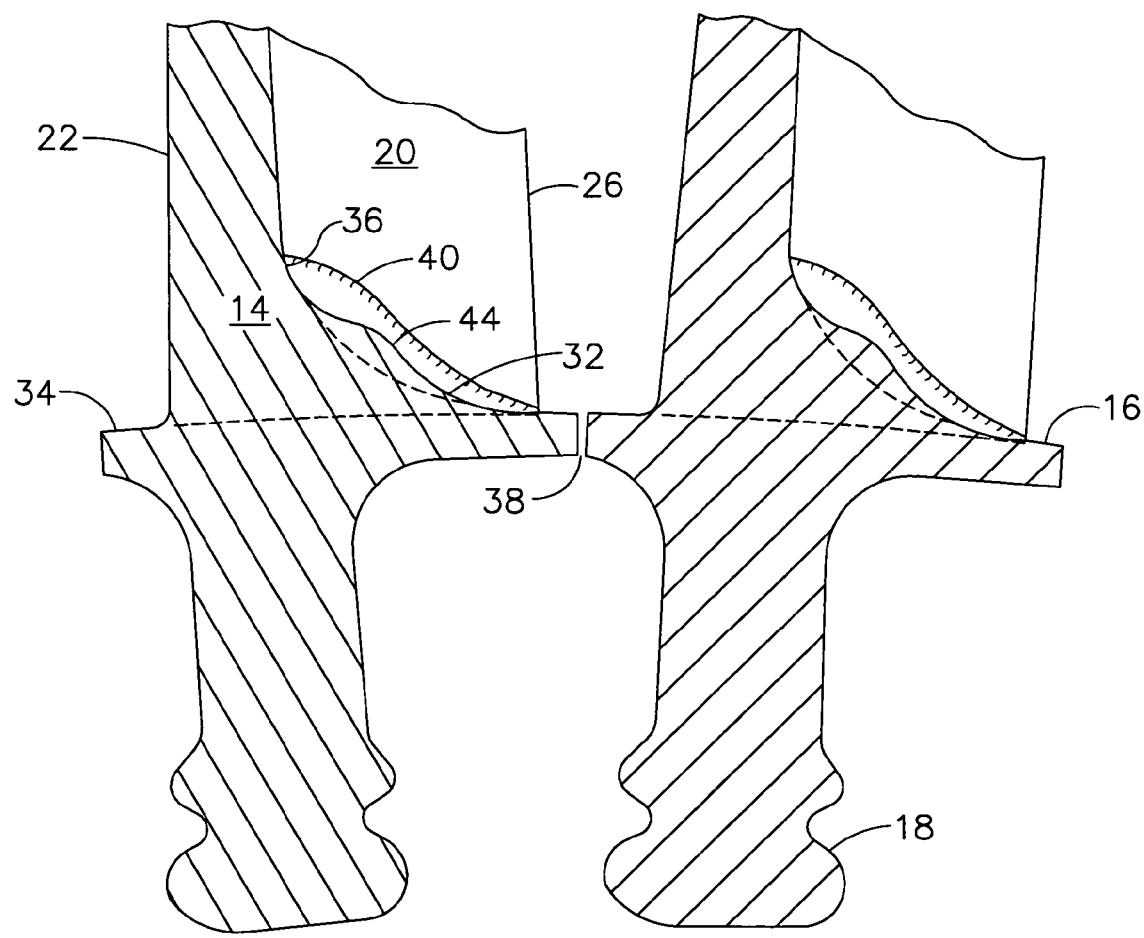
FIG. 9 is a radial sectional view through the blades illustrated in FIG. 8 and taken along line 9—9.

Illustrated in FIG. 7–9 is an alternate embodiment of the LPT stage in which the turbine blades 10 are ranged in the row with a conventional value of solidity, and a Zweifer number of 1.0. In this configuration, the higher number of turbine blades in the individual row compared with the previous embodiment discussed above correspondingly reduces the surface area of the individual platforms 16 for each blade. Accordingly, the axial splitlines 38 are disposed closer to the opposite pressure and suction sides of the individual airfoils and reduce the surface area in which the platform ramps 32 may be disposed.

FIGS. 7–9 of the second embodiment correspond with FIGS. 1–3 of the first embodiment, with it being recognized that the different turbine stages thereof would rotate in opposite directions. FIG. 1 illustrates an arrow for the clockwise rotation of the turbine stage, whereas FIG. 7 illustrates an arrow for counterclockwise rotation of the turbine stage, with the corresponding airfoils 14 being mirror images of each other.

Nevertheless, the two embodiments are generally similar to each other with both including the generally symmetrical crescentic platform ramps 32 on the pressure sides 20 of the airfoils.

However, in view of the smaller platforms, especially on the suction sides of the airfoils, the shallow bowls 42 of the first embodiment are not utilized in the second embodiment. Instead, FIGS. 8 and 9 illustrate that the nominal outer surface 34 extends around the leading and trailing edges 24,26 at the forward and aft ends of the platforms and further extends fully along the suction sides 22 of each airfoil along the corresponding axial splitline.

The entire suction side of the platform 16 therefore has a conventional axisymmetric surface profile, with the elevated ramp 32 being introduced solely on the pressure sides of the airfoils over most of the available surface area of the platform to the corresponding axial splitline. As illustrated in FIG. 9, the ramp 32 increases in height to its crest 36 on the pressure side of the airfoil, with the platform on the opposite suction side of the airfoil having the conventional radial position for its outer surface which forms the reference from which the ramp is measured radially outwardly.

In the first embodiment described above, the ramps 32 are smooth over substantially the entire surface area thereof blending circumferentially with the fillets 40 on the pressure side of the airfoil and the corresponding axial splitline. Those ramps also blend axially with the nominal outer surface of the platform along its opposite forward and aft ends.

However, the alternate embodiment shown in FIGS. 7–9 illustrates that the otherwise smooth ramp 32 may be modified locally for enhanced performance. For example, each ramp 32 may also include a local convex bulge 44 extending circumferentially outwardly toward the splitline from the crest 36, and spaced axially between the leading and trailing edges 24,26.

The exemplary bulge 44 illustrated in FIGS. 8 and 9 is a local change in curvature of the otherwise concave ramp 32. The bulge 44 is located near the axial and circumferential middle of the ramp 32 and has a convex profile both axially and circumferentially and blends around its perimeter with the concave ramp.

The local bulge 44 cooperates with the elevated ramp 32 to reduce the adverse affects of the horseshoe vortices generated during operation for correspondingly increasing turbine efficiency.

In the exemplary embodiments disclosed above, the individual flow passages 30 are defined between the pressure side of one airfoil and the suction side of the next adjacent airfoil and are bounded at the radially inner end by the corresponding portions of the two platforms 16 adjoining at the corresponding axial splitline 38.

Accordingly, the platform ramp 32 on the pressure side of one airfoil cooperates with the platform on the suction side of the next platform whether it has the nominal configuration illustrated in FIG. 8 or the shallow bowl configuration illustrated in FIG. 2.

The so modified platforms compared with conventional axisymmetric platforms without elevated or depressed features may be used to advantage for reducing the adverse affects of the horseshoe vortices which develop during operation along the corresponding platforms. Common to the LPT blades illustrated in these embodiments is the relatively high camber of the airfoils which permits the introduction of the complementary crescentic ramps 32 along most of the pressure sides thereof. The maximum height of the ramps is located near the midchord region of each airfoil, and the ramps are correspondingly generally symmetrical both forward to the leading edge and aft to the trailing edge thereof.

By using the elevated ramps between adjacent airfoils, the incoming horseshoe vortices can be laterally offset by the local streamline curvature of the combustion gases around the ramps. Correspondingly, the radially outward migration of the horseshoe vortices can be interrupted early in the flow passages by the modified platform outer surfaces.

The ramped platforms have been disclosed above for an LPT rotor stage, but could also be applied to a turbine nozzle stage. In a turbine nozzle, turbine vanes are integrally mounted in radially outer and inner endwalls or bands which are typically axisymmetrical circular profiles around the centerline axis. Both the inner and outer bands or platforms may be ramped in a manner similar to that disclosed above for reducing the adverse affects of the corresponding horseshoe vortices generated at the opposite ends of the turbine nozzle vanes.

The ramped platform may therefore be used for enhancing aerodynamic efficiency in any type of turbine engine, and for any type of turbine airfoil. Further examples include turbine rotor blisks in which the airfoils are integrally formed with the perimeter of the rotor disk. Since the LPT blades typically include integral tip shrouds, those shrouds or platforms may also include the crescentic ramps where they join the distal end of each airfoil.

Modern computer fluid dynamics analysis now permits the evaluation of various permutations of the ramped platforms for reducing horseshoe vortices to increase turbine efficiency. The specific contours of the crescentic ramps will vary as a function of the specific design, but the form of the ramps on the airfoil pressure side will remain similar for specifically reducing the adverse affects of the horseshoe vortices generated as the combustion gases split over the airfoil leading edges.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A low pressure turbine stage comprising:
   a row of solid airfoils integrally joined to corresponding platforms and spaced circumferentially apart to define respective flow passages therebetween for channeling combustion gases;
   each of said airfoils including a concave pressure side and a circumferentially opposite convex suction side extending axially in chord between opposite leading and trailing edges; and
   each of said platforms including a crescentic ramp adjoining said pressure sides thereof along a corresponding fillet extending between said leading and trailing edges, and said ramps are convex axially along said fillets and increase in height from said leading and trailing edges to a crest of maximum height near the midchord of said airfoils.

2. A turbine stage according to claim 1 wherein:
   said platforms include axial splitlines dividing circumferentially said flow passages between adjacent airfoils; and
   said ramps decrease in height from said pressure sides circumferentially toward corresponding splitlines.

3. A turbine stage according to claim 2 wherein:
   said platforms each include a nominal outer surface from which said ramp increases in height toward said pressure side; and
   said ramp terminates near said leading and trailing edges and blends with said outer surface thereat.

4. A turbine stage according to claim 3 wherein said ramps are concave circumferentially outwardly from said pressure sides between said crests and leading and trailing edges, and diverge substantially symmetrically from said crests toward said leading and trailing edges.

5. A turbine stage according to claim 4 wherein said ramps are smooth from said nominal outer surface to said fillets between said leading and trailing edges.

6. A turbine stage according to claim 4 wherein said ramps each include a convex bulge extending circumferentially outwardly from said crest and spaced between said leading and trailing edges.

7. A turbine stage according to claim 4 wherein said nominal outer surface extends around said leading and trailing edges and along said suction sides of said airfoils behind said crests.

8. A turbine stage according to claim 4 wherein each of said platforms further comprises a shallow bowl increasing in depth from said nominal outer surface to a corresponding suction side of said airfoils behind said crests.

9. A turbine stage according to claim 8 wherein said bowls are semicircular and centered on said suction sides behind corresponding crests on said pressure sides, and terminate at said nominal outer surface before said leading and trailing edges.

10. A turbine stage according to claim 4 wherein each of said airfoils further includes a tip shroud integrally joined to the distal tip end thereof, and said platforms slope outwardly toward said shrouds from said leading edges to said trailing edges.

11. A turbine stage comprising:
    a row of airfoils integrally joined to corresponding platforms and spaced circumferentially apart to define respective flow passages therebetween for channeling gases;
    each of said airfoils including a concave pressure side and a circumferentially opposite convex suction side extending in chord between opposite leading and trailing edges; and
    each of said platforms including a crescentic ramp increasing in height from said leading and trailing edges toward the midchord of said airfoil along said pressure side thereof.

12. A turbine stage according to claim 11 wherein:
said platforms include axial splitlines dividing circumferentially said flow passages between adjacent airfoils; and
said ramps decrease in height from said pressure sides circumferentially toward corresponding splitlines.

13. A turbine stage according to claim 12 wherein:
said platforms each include a nominal outer surface from which said ramp increases in height toward said pressure side; and
said ramp terminates near said leading and trailing edges and blends with said outer surface thereat.

14. A turbine stage according to claim 13 wherein said ramps terminate along said splitlines.

15. A turbine stage according to claim 13 wherein said ramps each include a crest of maximum height near said midchord, and diverge substantially symmetrically from said crest toward said leading and trailing edges.

16. A turbine stage according to claim 15 wherein said ramps are concave circumferentially outwardly from said pressure side between said crests and leading and trailing edges.

17. A turbine stage according to claim 15 wherein said ramps adjoin said pressure sides along a corresponding fillet extending between said leading and trailing edges, and said ramps are convex axially along said fillets and increase in height from said leading and trailing edges to said crests therebetween.

18. A turbine stage according to claim 15 wherein said ramps are smooth.

19. A turbine stage according to claim 15 wherein said ramps each include a convex bulge extending circumferentially outwardly from said crest and spaced between said leading and trailing edges.

20. A turbine stage according to claim 15 wherein said nominal outer surface extends around said leading and trailing edges and along said suction sides of said airfoils behind said crests.

21. A turbine stage according to claim 15 wherein each of said platforms further comprises a shallow bowl increasing in depth from said nominal outer surface to a corresponding suction side of said airfoils behind said crests.

22. A turbine stage according to claim 21 wherein said bowls are semicircular and centered on said suction sides behind corresponding crests on said pressure sides, and terminate at said nominal outer surface before said leading and trailing edges.

23. A turbine stage according to claim 15 wherein said airfoils are configured as low pressure turbine airfoils having solid sections, and said platforms slope outwardly from said leading edges to said trailing edges.

24. A turbine stage according to claim 23 wherein each of said airfoils further includes a tip shroud integrally joined to the distal tip end thereof.

* * * * *